United States Patent [19]

Beadle

[11] 3,867,359

[45] Feb. 18, 1975

[54] PROCESS OF VULCANIZING NEOPRENE BY USING CERTAIN 2-HYDROXYALKYL N,N-DIALKYLDITHIOCARBAMATES AS ACCELERATORS

[75] Inventor: Howard C. Beadle, Norwalk, Conn.

[73] Assignee: R. F. Vanderbilt Company, Inc., New York, N.Y.

[22] Filed: Nov. 16, 1973

[21] Appl. No.: 416,506

[52] U.S. Cl. ............................................. 260/79.5 C
[51] Int. Cl. ...................... C08c 11/54, C08f 27/06
[58] Field of Search ........... 260/79.5 C, 79.5 R, 793

[56] References Cited
UNITED STATES PATENTS 3,370,051  2/1968  Sullivan et al. ................ 260/79.3 R Primary Examiner—Donald E. Czaja
Assistant Examiner—Deborah L. Kyle
Attorney, Agent, or Firm—Brumbaugh, Graves, Donohue & Raymond

[57] ABSTRACT

The specification relates to the vulcanization of neoprene by using certain 2-hydroxyalkyl N,N-dialkyldithiocarbamates as accelerators. The specification relates also to vulcanizates containing these accelerators.

10 Claims, No Drawings

PROCESS OF VULCANIZING NEOPRENE BY USING CERTAIN 2-HYDROXYALKYL N,N-DIALKYLDITHIOCARBAMATES AS ACCELERATORS

BACKGROUND OF THE INVENTION

It is known to provide a vulcanizate from neoprene rubber. Neoprene is the generic name in the art for polychloroprene, i.e., a polymer of 2-chloro-1,3-butadiene (Encyclopedia of Polymer Science and Technology, Vol. 3, page 105, which is incorporated herein by reference).

In the past, neoprene has been compounded with various ingredients in order to form subsequently a vulcanizate. The compounded neoprene has been grouped in the following two classes: "sulfur-modified" and "non-sulfur-modified" (U.S. Pat. No. 3,370,051 which is incorporated herein by reference).

Generally, the sulfur-modified neoprene requires only a metal oxide for vulcanization. Conversely, the non-sulfur-modified neoprene usually needs an accelerator in addition to a metallic oxide in order to effect suitable curing.

When neoprene rubber is vulcanized, elevated temperatures are employed. Several known accelerators, however, are highly active at relatively low temperatures, and this may cause serious premature vulcanization (scorching) during the processing of non-sulfur-modified neoprene. Furthermore, many accelerators, which have been used previously in the art, do not provide a neoprene vulcanizate with satisfactory physical properties.

SUMMARY OF THE INVENTION

It has now been discovered that the aforementioned difficulties can be overcome by compounding the neoprene rubber with certain 2-hydroxyalkyl N,N-dialkyldithiocarbamates. Thus, in accordance with this invention, a non-sulfur-modified neoprene rubber is compounded with a metal oxide and a 2-hydroxyalkyl N,N-dialkyldithiocarbamate. The compound rubber is cured subsequently to form a vulcanizate with acceptable properties and with a minimal amount of scorching.

DESCRIPTION OF THE INVENTION

In the present invention, the neoprene rubber is compounded with a carbamate having the following structure:

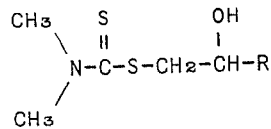

wherein R is selected from the group consisting of hydrogen or methyl. This includes, therefore, 2-hydroxyethyl dimethyldithiocarbamate, 2-hydroxylpropyl dimethyldithiocarbamate and mixtures thereof.

These carbamates may be prepared by any suitable method. One method, among others, is to react the corresponding dithiocarbamate salt with a haloalcohol (U.S. Pat. No. 3,407,222 which is incorporated herein by reference).

The dithiocarbamate accelerators of the invention can be incorporated into the neoprene rubber in an effective amount, e.g., about 1 to 5 parts per hundred parts of rubber (phr), preferably 1.5 to 3 phr. Any satisfactory compounding procedure, such as mechanical mixing, can be used to incorporate the accelerator in the rubber. The dithiocarbamates, moreover, can be added as a liquid or as a solid, e.g., formulated on an inert carrier.

Another component in the compounded neoprene rubber is an alkaline earth metal oxide. The following compounds, among others, are satisfactory: zinc oxide, magnesium oxide, and mixtures thereof. Any effective amount of oxide, such as 4 to 30 phr, preferably 4 to 15 phr, can be compounded with the rubber. An especially preferred oxide component is a mixture of 10 phr zinc oxide and 4 phr magnesium oxide.

Other ingredients may be compounded with the neoprene rubber. The following optional ingredients, among others, are applicable: antioxidants, plasticizers, peptizers, fillers, extenders, reinforcing materials, carbon blacks, fatty acids and lubricants.

Any suitable curing procedure and conditions may be employed in the invention. Two methods, among others, are to press-cure at a temperature of about 280° to 360°F. for about 10 to 120 minutes and to vulcanize continuously at a temperature of about 360° to 400°F. for about 5 to 150 seconds.

Thus, in accordance with this invention, a non-sulfur-modified neoprene has been cured with either of two specific dithiocarbamate accelerators. A vulcanizate is obtained therefrom with reduced scorching. Furthermore, the vulcanizate of the invention has excellent mechanical and physical properties.

It is critical in the invention to employ 2-hydroxyethyl dimethyldithiocarbamate or 2-hydroxypropyl dimethyldithiocarbamate. Other higher homologs, such as 2-hydroxypropyl di-n-propyldithiocarbamate and 2-hydroxyethyl dibutyldithiocarbamate, are not satisfactory.

The following examples are submitted to illustrate but not to limit the scope of the invention. Unless otherwise indicated, all parts and percentages in the specification and claims are based upon weight.

EXAMPLE I

Vulcanizates A, B and C were prepared by compounding non-sulfur-modified neoprene with a 2-hydroxyalkyl dialkyldithiocarbamate and other ingredients to form samples as listed in Table 1 herebelow:

Table 1

| Ingredients | Vulcanizates (parts by weight) | | |
|---|---|---|---|
| | A | B | C |
| Neoprene W | 100 | 100 | 100 |
| Stearic acid | 0.5 | 0.5 | 0.5 |
| Agerite Stalite S (a) | 1.5 | 1.5 | 1.5 |
| Agerite Resin D (b) | 1.5 | 1.5 | 1.5 |
| Rio Resin (c) | 10 | 10 | 10 |
| Plasticizer SC (d) | 10 | 10 | 10 |
| P-33 (e) | 25 | 25 | 25 |
| Atomite (f) | 25 | 25 | 25 |
| FEF Black | 25 | 25 | 25 |
| Magnesium oxide | 4 | 4 | 4 |
| Zinc oxide | 10 | 10 | 10 |
| 2-Hydroxypropyl dimethyldithiocarbamate | 1.5 | 2.0 | — |
| 2-Hydroxyethyl dimethyldithiocarbamate | — | — | 1.5 |

Table 1-Continued (a) mixture of alkylated diphenylamines
(b) polymerized 1,2-dihydro-2,2,4-trimethylquinoline
(c) blend of resinous and antioxidative material; organic modifier
(d) triglycol ester of vegetable oil fatty acid
(e) carbon black
(f) calcium carbonate filler The compounded samples were press-cured at 307°F. for about 45 minutes.

The following properties of the vulcanizates were determined: percent elongation, tensile strength and stress in accordance with ASTM D-412 method; the scorching time according to Mooney; and the compression set by ASTM Method B. The results are indicated in Table 2.

Table 2

| Vulcanizate | Mooney Scorch at 250° F (Minutes) | Percent Compression Set ASTM Method B 70 Hours at 212° F (%) | Vulcanizing Time (Minutes) | Stress at 200% (psi) | Tensile Strength (psi) | Elongation at Break (%) |
|---|---|---|---|---|---|---|
| A | 10 | 25.45 | 20 | 600 | 2110 | 560 |
|   |    |       | 30 | 600 | 2110 | 560 |
| B | 10 | 27.6  | 20 | 590 | 2100 | 620 |
|   |    |       | 30 | 600 | 2100 | 590 |
| C | 9  | 25.3  | 20 | 610 | 2080 | 560 |
|   |    |       | 30 | 600 | 2090 | 550 |

This example demonstrates that an excellent cure is secured when neoprene rubber is compounded with 2-hydroxyethyl or 2-hydroxypropyl dimethyldithiocarbamate.

EXAMPLE II

Non-sulfur-modified neoprene was compounded with various ingredients as shown in Table 3.

Table 3

| Ingredients | Vulcanizates (parts by weight) | | | |
|---|---|---|---|---|
|  | D | E | F | G |
| Neoprene W | 100 | 100 | 100 | 100 |
| Stearic acid | 0.5 | 0.5 | 0.5 | 0.5 |
| Plastogen (a) | 5 | 5 | 5 | 5 |
| Thermax (b) | 75 | 75 | 75 | 75 |
| MgO | 4 | 4 | 4 | 4 |
| ZnO | 5 | 5 | 5 | 5 |
| 2-Hydroxypropyl dimethyldithiocarbamate | 1.5 | — | — | — |
| 2-Hydroxybutyl dibutyldithiocarbamate | — | 1.5 | — | — |
| 2-Hydroxypropyl di-n-propyldithiocarbamate | — | — | 1.5 | — |
| 2-Hydroxyethyl dibutyldithiocarbamate | — | — | — | 1.5 |

(a) High molecular weight sulfonic acid in paraffin oil
(b) carbon black

After press-curing at 307°F. for various minutes, physical properties of the resulting vulcanizates were determined as set forth in Example I and in Encyclopedia of Polymer Science and Technology, Vol. 12, pages 288–293, which is incorporated herein by reference. The results are compiled in Tables 4 and 5.

Table 4

| Vulcanizate | Vulcanizing Time (Min.) | Stress at 200% (psi) | Tensile Strength (psi) | Hardness |
|---|---|---|---|---|
| D | 15 | 300 | 1400 | 50 |
|   | 30 | 890 | 2240 | 59 |
|   | 45 | 1110 | 2330 | 61 |
| E | 15 | 190 | 1100 | 46 |
|   | 30 | 320 | 1540 | 50 |
|   | 45 | 480 | 2000 | 53 |
| F | 15 | 190 | 1110 | 45 |
|   | 30 | 380 | 1770 | 50 |
|   | 45 | 470 | 1980 | 52 |
| G | 15 | 160 | 1120 | 46 |
|   | 30 | 300 | 1640 | 50 |
|   | 45 | 400 | 1990 | 51 |

Table 5

| Vulcanizate | Mooney Scorch at 250°F (Minutes) |
|---|---|
| D | 16 |
| E | 21 |
| F | 19 |
| G | 20 |

The criticality of using only certain dithiocarbamates is illustrated in this example.

Having set forth the general nature and specific embodiments of the present invention, the true scope is now particularly pointed out in the appended claims.

What is claimed is:

1. A vulcanizable composition comprising a non-sulfur-modified neoprene rubber; an alkaline earth metal oxide; and an accelerator having the generic formula:

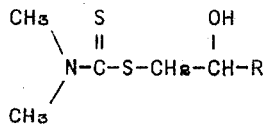

wherein R is selected from the group consisting of hydrogen and methyl.

2. The composition according to claim 1 in which the accelerator is selected from the group consisting of 2-hydroxyethyl dimethyldithiocarbamate, 2-hydroxypropyl dimethyldithiocarbamate and mixtures thereof.

3. The composition according to claim 1 in which the accelerator is 2-hydroxyethyl dimethyldithiocarbamate.

4. The composition according to claim 1 in which the accelerator is 2-hydroxypropyl dimethyldithiocarbamate.

5. The composition according to claim 1 in which the accelerator is incorporated in an amount of about 1 to 5 phr.

6. A process for providing a vulcanizate with excellent physical properties and with reduced scorching comprising compounding a non-sulfur-modified neoprene rubber with an alkaline earth metal oxide and an accelerator having the generic formula:

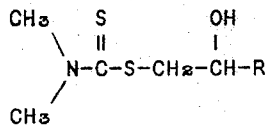

wherein R is selected from the group consisting of hydrogen and methyl.

7. The process according to claim 6 in which the accelerator is selected from the group consisting of 2-hydroxyethyl dimethyldithiocarbamate, 2-hydroxypropyl dimethyldithiocarbamate and mixtures thereof.

8. The process according to claim 6 in which the accelerator is 2-hydroxyethyl dimethyldithiocarbamate.

9. The process according to claim 6 in which the accelerator is 2-hydroxypropyl dimethyldithiocarbamate.

10. The process according to claim 6 in which the neoprene rubber is compounded with the accelerator in an amount of about 1 to 5 phr.

* * * * *